(12) United States Patent
Seigel

(10) Patent No.: US 6,229,313 B1
(45) Date of Patent: *May 8, 2001

(54) MAPPING OF PIPELINE GROUNDING POINTS BY AIRBORNE OR GROUND MAGNETIC MEASUREMENTS OF CURRENT FLOW IN THE PIPELINE

(75) Inventor: Harold O. Seigel, Toronto (CA)

(73) Assignee: Scintrex Limited, Concord (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,583

(22) Filed: May 27, 1999

(51) Int. Cl.$^7$ ............................ G01N 27/00; G01V 3/16; G01V 3/00
(52) U.S. Cl. ............................ 324/557; 324/330; 324/345
(58) Field of Search ........................ 324/557, 326, 324/330, 345

(56) References Cited

U.S. PATENT DOCUMENTS

| | | | |
|---|---|---|---|
| 4,628,266 | * 12/1986 | Dzwinel | 324/330 |
| 5,119,028 | * 6/1992 | Mooney | 324/326 |
| 5,610,523 | * 3/1997 | Elliot | 324/330 |
| 5,923,170 | * 7/1999 | Kuckes | 324/326 |

FOREIGN PATENT DOCUMENTS 1184974   4/1985   (CA) ........................ 324/7

* cited by examiner

*Primary Examiner*—Safet Metjahic
*Assistant Examiner*—James C. Kerveros
(74) *Attorney, Agent, or Firm*—Sim & McBurney

(57) ABSTRACT

Apparatus for remotely determining the amount of current I flowing in a long, linear conductor, comprising a first sensor for measuring at a first location a magnetic field H arising due to current flow, a second sensor for measuring at a second location the same magnetic field H, a mounting mechanism for fixing the position of the first and second sensors in an unchanging, spaced-apart mutual configuration, calculating apparatus for calculating the vertical gradient H' of the magnetic field on the basis of measurements made by the sensors, and further calculating apparatus for determining the current I on the basis of the equation $I = H^2/H'$ where k is a constant.

21 Claims, 2 Drawing Sheets

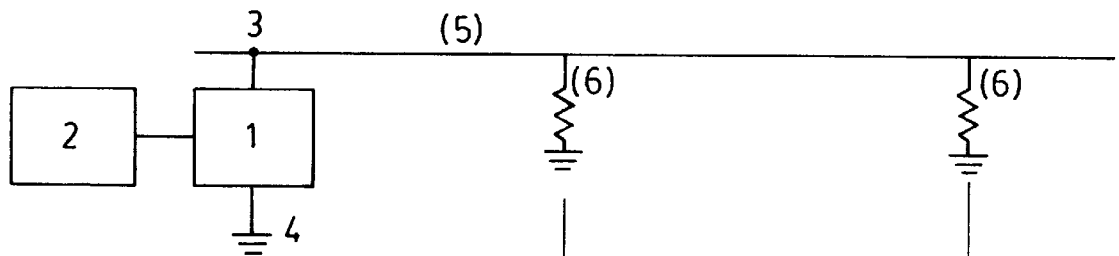
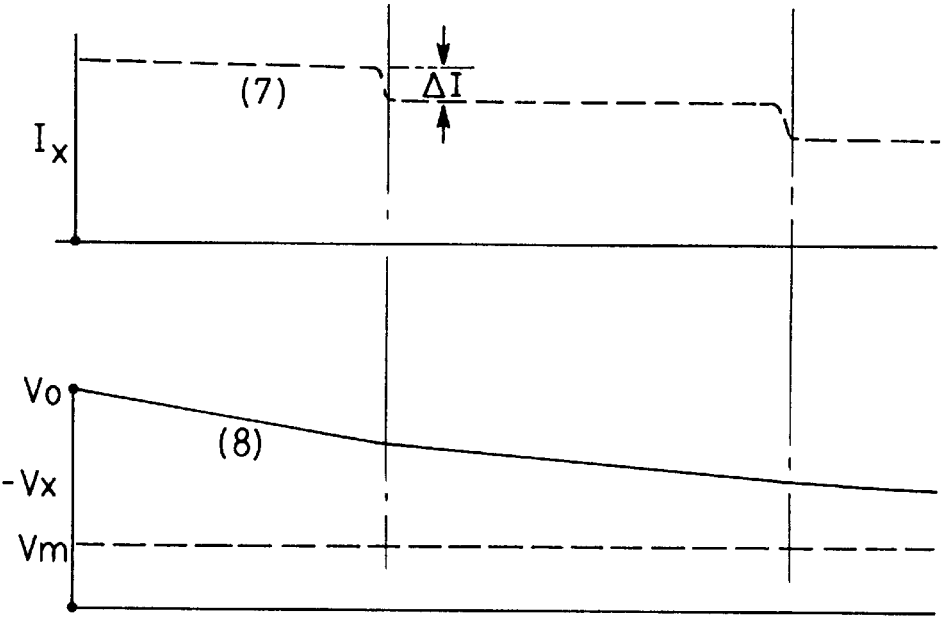
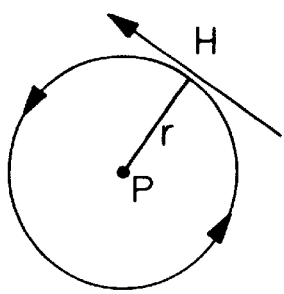

MAPPING OF PIPELINE GROUNDING POINTS BY AIRBORNE OR GROUND MAGNETIC MEASUREMENTS OF CURRENT FLOW IN THE PIPELINE

FIELD OF THE INVENTION

This invention relates in general to pipeline monitoring systems, and more particularly to a method and apparatus for monitoring pipelines and the like for current loss locations.

BACKGROUND OF THE INVENTION

Major pipelines, for transport of gases, liquids and slurries over long distances, are commonly made of steel which provides both strength and economy. Customarily, the pipelines are buried beneath the surface of the ground for protection, or pass under rivers or lakes in their paths. Under these conditions, such pipelines are subject to corrosion, due to electrochemical action, as a result of portions of the metal surface of the pipe coming into contact with electrolytes in the ground. To reduce the probability of corrosion occurring, these pipelines are commonly coated with an impermeable (electrically resistive) material, such as bitumens and mylar, etc.

Nevertheless, no coating is perfect, and all coatings deteriorate with time, aided by ground movement or as a result of attack by water, chemical or biological agents, resulting in ground contact points being developed. Such contact points are generally known as "holidays" in the pipeline industry. It is at such holidays that corrosion may occur.

Metal ions escape from the pipe at the ground contact point when the metal of the pipe is electropositive in potential relative to the electrolyte with which it is in contact in the ground. This causes corrosion. In the extreme, the pipe is so weakened by the loss of metal that a leak is formed, and the contents being transported start to escape. To reduce the possibility of such a condition occurring along the pipeline, corrosion engineers take steps to lower the potential of the pipe relative to the ground, by applying a negative DC voltage, using a DC generator. This is the practice of "cathodic protection" or "CP".

Further details of cathodic protection practices may be found in such sources as:

1) Parker, Marshal, E.; Pipeline Corrosion and Cathodic Protection: a Practical Manual for Corrosion Engineers. 3$^{rd}$ Edition. Gulf Publishing Co., Houston, Tex. 1984, or
2) Morgan, John, H. Cathodic Protection (Second Edition), National Association of Corrosion Engineers. Houston, Tex., 1987.

SUMMARY OF THE INVENTION

As discussed in greater detail below, according to the present invention, a method and apparatus is provided for monitoring pipelines and the like for locations where current losses through leakage will indicate where the metal of the pipe comes into direct contact with ground water and may be the sites for pipeline corrosion.

It is an object of one aspect of the invention to provide a method and apparatus for the rapid and economical determination of the presence and location of any large holidays along major pipelines. It is a further aim to allow the measurements necessary to achieve these objectives to be made without the necessity to contact the pipeline, and, in fact, that they can be made from an aircraft or helicopter. It is a further object of an aspect of the invention to map the CP voltage-to-ground along the pipeline. It is still a further object of an aspect of the invention to provide a system which does not require modification of the existing CP system on the pipeline in order for the invention to be applied.

A second embodiment of this invention is disclosed, which may be applied when there is no active CP system in place on the pipeline, or when the pipeline traverses a region of high magnetic noise, due to natural or man-made sources, which may act to introduce errors into the measurements made with the first embodiment.

BRIEF DESCRIPTION OF THE DRAWINGS

A better understanding of the prior art and of the present invention will be had with reference to the description below in conjunction with the drawings, in which:

FIG. 1(a) is a schematic representation of a cathodic protection system for a pipeline according to the prior art;

FIG. 1(b) is a graph showing current flow along the pipeline in the cathodic protection system of FIG. 1 (a);

FIG. 1(c) is a graph showing applied voltage-to-ground of the pipeline shown in FIG. 1(a) as a function of distance along the pipeline;

FIG. 2 is a schematic representation of the amplitude H of the magnetic field associated with a current flow I in the pipeline of FIG. 1(a), at a distance r from the pipeline center;

DESCRIPTION OF THE PRIOR ART AND PREFERRED EMBODIMENT

Figure 3:
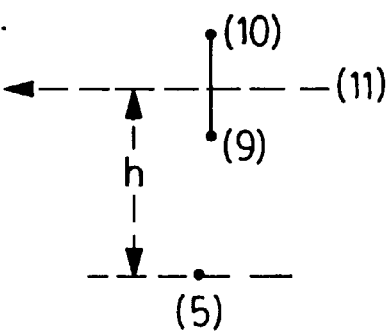
FIG. 3 illustrates a vertically spaced apart sensor configuration according to a first embodiment of the invention.

In FIG. 1(a), a DC generator (1), powered by a local AC source (2), is connected across a contact point (3) on a pipeline (5) and to a nearby ground point (4). Because of the voltage difference created by the CP between the pipe and the ground, there will be some current flowing from the pipe to ground at each holiday (6). FIG. 1(b) shows schematically how the current flow Ix (7) along the pipe changes, with distance x away from the CP DC generator, due to the presence of one or more holidays (6). In the absence of any significant holidays (6) in a section of the pipe, the current will remain relatively constant along that section. Whenever a holiday occurs, there will be current loss, so that the current flow beyond this holiday will be reduced to a lower level. FIG. 1(c) shows how the applied voltage-to-ground Vx (8) of the pipe changes as a function of distance x along the pipe from the point of CP current entry. It will noted that the voltage progressively decreases, due to the ohmic loss in the pipe. If the applied voltage-to-ground falls below a certain critical value, Vm, it may no longer act to prevent corrosion at a holiday at and beyond that region of pipeline.

Thus, to ensure the integrity and proper function of the CP which has been installed on a major pipeline it is important to determine the following:

1) Where significant holidays may occur, so that remedial action can be taken to seal them against existing or possible future corrosion, and 2) Where the applied CP voltage-to-ground falls below a critical value, beyond which it is no longer effective in preventing corrosion from occurring.

At the present time the methods employed to determine these factors, as described in the above mentioned references require that tedious measurements be made on the ground. These are particularly onerous, in terms of time and cost, when major pipelines, e.g. 10–1000 km in length, are concerned.

According to Canadian Patent No. 1,184,974, "Process and Apparatus for Airborne Surveys of Cathodic Protection of Underground Pipelines", inventor Michael E. Stamm, issued Apr. 2, 1985, a system is disclosed for remote measurement of the amount of current flow in a pipeline. This prior art system utilizes one or more AC magnetometers, in the same horizontal plane, which measure the AC field due to ripple on the full-wave rectified DC current created for corrosion protection of the pipeline. A problem with this prior art system is that the signal from each magnetometer is treated separately, and the determination of the amount of current flowing is critically dependent on an estimate of the depth of burial of the pipeline beneath the aircraft. This estimate is made on the basis of assumptions which are subject to error due to the fact that the depth of burial of the pipeline beneath the ground surface may be quite variable. This can result in serious errors in the determination of the amount of the current flow. As set forth below, the system of the present invention is designed to avoid the necessity of estimating the depth of burial of the pipeline.

As discussed briefly above, according to one aspect of this invention a method and apparatus are provided for the rapid and economical determination of the presence and location of large holidays along major pipelines. It is a further aim to allow the measurements necessary to achieve these objectives to be made without the necessity to contact the pipeline, and, in fact, that they can be made from an aircraft or helicopter. It is a further aim to map the CP voltage-to-ground along the pipeline. It is still a further aim of this embodiment that there need be no modification of the existing CP system on the pipeline in order for the invention to be applied.

A second embodiment of this invention is disclosed, which may be applied when there is no active CP system in place on the pipeline, or when the pipeline traverses a region of high magnetic noise, due to natural or man-made sources, which may act to introduce errors into the measurements made with the first embodiment.

More particularly this invention provides an apparatus for remotely determining the amount of current I flowing in a long, linear conductor, comprising:

a first sensor means for measuring at a first location a magnetic field H arising due to current flow, a second sensor means for measuring at a second location the same magnetic field H, mounting means for fixing the position of the first and second sensor means in an unchanging, spaced-apart mutual configuration, calculating means for calculating the vertical gradient H' of said magnetic field on the basis of measurements made by the sensors, and means for calculating the said current I on the basis of the equation I=kH²/H' where k is a constant.

Further, this invention provides a method for remotely determining the amount of current I flowing in a conductor comprising the steps of:

measuring at a first location a magnetic field H arising due to the current flow, measuring at a second location the same magnetic field H, maintaining the first and second locations in an unchanging, spaced-apart mutual configuration, determining from the measurements at said locations the vertical gradient H' of said magnetic field, and calculating the current I on the basis of the equation I=kH²/H' where k is a constant.

Theory

Cathodic Protection Current

This portion of the theory relates to one embodiment of the invention that utilizes the DC currents in the pipeline caused by an existing CP system. Referring to FIG. 1(c), assume that the CP voltage of the pipe to ground at the DC generator ground contact location is $V_o$ volts (negative relative to the ground). Also, let R be the resistance of the pipe, in ohms per meter of length. For example, for a 24" diameter steel pipe, wall thickness 0.375", $R=1.0 \times 10^{-5}$ ohms per meter.

At a point on the pipe a distance x from the DC generator, let $I_x$ be the amplitude, in amperes, of the current flow, and $V_x$ be the resultant CP voltage.

Then:

$$dV_x/dx = RI_x \ldots \text{in volts per meter} \qquad (1)$$

and:

$$V_x = V_o - R \int I_x d_x \qquad (2)$$

Thus, if the distribution of $I_x$ along the pipe could be measured, (FIG. 1b) and if $V_o$ and R are known to the corrosion engineers working on the pipeline, we could determine the value of $V_x$ at all points along the pipe. We could then ensure that $V_x$ did not fall below the minimum negative voltage Vm required to prevent corrosion. We could also determine where significant holidays occur, as well as the resistance to ground at each holiday. For example, if ΔI is the difference in measured current levels, above and below a holiday, then it is also the current which flows to ground at the holiday. The resistance-to-ground ($R_g$) at this holiday will be given by:

$$R_g = V_x/\Delta I \ldots \text{ohms} \qquad (3)$$

When $R_g$ falls below a certain value, remedial action may be required (e.g. excavation and re-coating) at that holiday.

It is a basic law of physics that there is a magnetic field associated with all current flows. For example, (FIG. 2) the amplitude H of the magnetic field associated with current flow I in a long, linear, conductor P (e.g. a pipe), at a distance r from it, is given by:

$$H = 200 I/r \qquad (4)$$

where H is in nanoTeslas (nT), I is in amperes, and r is in meters. This field is coaxial to the pipe, and lies only in the plane perpendicular to the pipe.

It is normal practice to use "total field" magnetometers in surveys to map the spatial variations of the Earth's magnetic field. These sensors are typically of the quantum, or optically-pumped variety, often using cesium vapor. With such sensors it may be shown that for variations of only a few hundred nT or less, in a typical total Earth's field of 40,000 to 60,000 nT, only that component of the variation field that is in the direction of the local Earth's magnetic field is required to be measured.

If it is assumed that the Earth's magnetic field has an inclination of φ degrees, and that the orientation of the pipe makes an angle of 0 degrees relative to magnetic north, then M, the component of H along the Earth's magnetic field direction is given by:

$$M = 200I(h \cos \phi \sin \theta + y \sin \phi)/r^2 \quad (5)$$

where h is the elevation in meters of the magnetometer sensor above the level of the pipe; y is the horizontal distance, in meters, of the sensor from the pipe, and $r^2 = h^2 + y^2$.

The M function has a bipolar curve form, with positive and negative peaks, separated by a zero crossover. It can be shown that the amplitudes of the peaks of M each attenuate with elevation as $h^{-1}$, and are a function of the "orientation parameter" $\cot \phi \sin \theta$. Provided that the orientation of the pipeline remains constant throughout a long section of the pipeline, then the peak-to-peak amplitude of the magnetic field anomaly M due to it is proportional to $h^{-1}$, with a constant factor of proportionality. The vertical gradient of M, which may be denoted as M', is obtained by dM/dh in Equation (5). Thus,:

$$M' = 200I\{(h^2 + y^2)\cos \phi \sin \phi - 2hy \sin \theta\} \quad (6)$$

in nT per meter. This has a primarily bipolar curve form, with two main peaks, one positive and the other negative, but with a third peak of much lesser amplitude as well. Equation (6) may be rewritten as:

$$M' = 200I \sin \phi\{(y^2 - h^2)\cot \phi \sin \theta - 2hy\}/r^4 \quad (6')$$

Setting $A = \cot \phi \sin \theta$ and $a = y/h$, Equation (6') can be rewritten as:

$$M = 200I \sin \phi\{(a^2-1)A - 2a\}/^2(a^2+1)^2 \quad (6'')$$

Using the same notation, Equation (5) may be rewritten for the total field anomaly as $$M = 200I \sin \phi(A+a)/h(a^2+1) \quad (5'')$$

For θ and constant, that is, for a straight section of the pipeline, the peak-to-peak values of M and M' will be proportional to I, and, in the case of M, will be inversely proportional to h. In the case of M', the peak-to-peak values will be inversely proportional to $h^2$.

If the values of h, θ and φ can be determined, and if the observed peak values of M and/or M' are measured, then either one of equations (5") and (6") can be inverted to determine the value of I. However, the determination of the value of h, the elevation of the height of flight above the pipeline, requires the use of precise altimetry (by laser altimeter), accurate GPS (Global Positioning System) elevation measurements along the flight line, and an assumption to be made about the depth of burial of the pipeline beneath the surface of the ground.

Experience has shown that unacceptable errors in the determination of I can result from errors in the determination of h, particularly in equation (6"), where h enters as a squared quantity. However, the inventor has found that a more accurate and robust approach to the determination of I, without any assumption as to the value of h, can be made as follows:

From Equations (5) or (5") it will be noted that the peak-to-peak value of M is inversely proportional to h. From Equations (6) or (6") it will be noted that the peak-to-peak value of M' is inversely proportional to $h^2$. Thus, taking the ratio of $M_o^2/M'_o$, where the subscript $_o$ denotes the peak-to-peak values of these quantities, then a quantity can be derived which is proportional to I, viz.

$$I = kM_o^2/M'_o \quad (7)$$

where k is a function of φ and θ. For a long, straight section of pipeline, φ and θ are determinable from the known Earth's magnetic field orientation and from the orientation of the pipeline as determined by the magnetic survey itself. Then the value of k can be calculated from the values of φ and θ, and the peak-to-peak values of $M_o$ and $M_o$, for various values of x. The benefits of using peak-to-peak values are that it eliminates the necessity of estimating the local level of the Earth's magnetic field, and also suppresses errors due to long-wavelength gradients of this field.

The important consequence of determining I through the application of Equation (7), rather than from Equations (5) or (6), is that the latter two approaches would require an estimate of h to be made. Despite the ability to accurately measure the height of an aircraft above the ground surface, e.g. with an expensive laser altimeter, the value of the depth of burial of the pipeline beneath this surface cannot be so determined, and is subject to unacceptable error. Employing Equation (7) avoids any dependence on the estimation of h.

Thus, FIG. 3 illustrates one sensor configuration for the first embodiment of this invention. Two total field magnetic field sensors (9) and (10) are rigidly spaced apart vertically and are transported on an aircraft or helicopter, on a short traverse over the CP-DC current-carrying pipeline, at a height h.

Applied Current Flow

Under certain circumstances there may be an impediment to making the magnetic field measurements necessary for the precise determination of I using the above first embodiment of my invention. Such circumstances might include:

1) There is no CP current flowing, either because it has never been installed, or is temporarily inoperative.

2) There is considerable ferrous material in place, which gives rise to strong magnetic field distortions in close proximity to the pipeline, and corrupts the necessary measurements. This ferrous material may be man-made or natural, e.g. from near-surface geologic sources.

3) There is a very narrow right-of-way in which the pipeline lies, and the determination of the peak values of M and M' on either side of the pipeline would necessitate exceeding the right-of-way when the survey aircraft crosses the pipeline.

In any of these circumstances the following approach may be employed:

FIG. 1(a) may also serve to show, in block diagrammatic form, this embodiment as well. The output of an AC generator (1), powered either by a diesel or gasoline engine (2) or by mains power (if available), is connected across an access point (3) on the pipeline, and to a well grounded electrode (4). If there is an active cathodic protection system in place on the pipeline, the AC generator may be connected in series with a DC generator supplying the cathodic protection current.

The AC generator thus causes an AC current to flow along the pipeline (5), and to ground through any holidays (6) (i.e. ground contact points), in both directions from the point of contact of the AC generator.

The frequency of the AC generator is set to a value which is quite distinct from the power line frequency and from any of its harmonics or sub-harmonics, and is low enough to avoid serious losses due to eddy currents in the soil in which the pipeline is buried. Commonly the frequency is selected in the range of 5 to 100 Hz, but others may be used, depending on the local conditions. The frequency is commonly crystal controlled, so that very narrow-band receivers may be employed, thereby reducing the effect of power line noise and other magnetic field noises.

As an alternative to using an AC generator to create an AC current along the conductor, in the case where there is a DC CP current flowing in the conductor, advantage may be taken of the fact that such currents are commonly derived by full-wave rectification of a single or three phase AC generator output, producing an AC ripple on the CD current. This ripple will have twice the frequency of the AC power source, e.g. 120 Hz from a 60 Hz source, if single phase, or 360 Hz if three phase. This was the signal used for measurement in Canadian Patent 1,184,974, cited above.

It should be noted, however, that Canadian Patent 1,184,974 does not disclose the use of simultaneous measurements of a magnetic field and the vertical gradient of the magnetic field, which is the basis of this invention. From a signal/noise standpoint using the AC ripple is not always as desirable for this invention as employing an auxiliary AC generator, whose frequency is quite separate from any of the harmonics or sub-harmonics of the power line frequency. The latter may already be present on the power lines in the area and can create noise on the measurements of this embodiment.

FIG. 2 and equation (4) apply equally well to the magnetic field associated with current flow in the pipeline in this embodiment as well as to the CP current in the first embodiment. However, in this second embodiment, it is generally more expedient to use one (or more) magnetic field sensors, each of which measures one component of the AC magnetic field. Commonly these sensors take the form of induction coils, with or without ferrous cores, or else are fluxgate magnetometers, based on saturable μ-metal cores.

Figure 4:
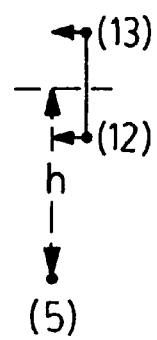
FIG. 4 illustrates a further vertically spaced apart sensor configuration according to a second embodiment of the invention.

FIG. 4 illustrates one sensor configuration for the second embodiment of this invention. Two component AC magnetic field sensors (12) and (13) are rigidly spaced apart vertically, and are transported by an aircraft or helicopter along the AC current carrying pipeline (5), at a height h. The sensor system is maintained, as closely as possible, directly over the pipeline, although some small displacement y is inevitable.

It can be seen that the most useful magnetic field component to measure in this embodiment is the horizontal component, orthogonal to the axis of the pipeline, i.e. $H_y$. We find that $$H_y = 200Ih/(h^2+y^2) \quad (8)$$

The vertical derivative of this component is given by $H_y'$, where $$H_y' = 200I(h^2-y^2)/(h^2+y^2)^2 \quad (9)$$

Taking the ratio $B_y$ of $H_y^2/H_y'$, it will be noted that $$B_y = -200Ih^2/(h^2-y^2) \quad (10)$$

Directly over the pipeline y=0, so that $$B_y = 200I \quad (1)$$

i.e., I is directly proportional to $B_y$.

However, since it is impractical to consider that a measurement of $H_y$ and $H_y'$ can always be made directly over the pipeline, the error involved in it not being so should be determined. Equation (9) may be rewritten as $$B_y = 200I/(a^2-1) \quad (9')$$

or $$I = B_y(a^2-1)/200 \quad (12)$$

where a=y/h, the relative offset of the measurement location from being directly over the pipeline. Table I provides the error function $(1-a^2)$.

TABLE 1

| | Offset Error Factor, for $H_y$, $H_y'$ | | | | | |
|---|---|---|---|---|---|---|
| a | 0 | 0.1 | 0.2 | 0.3 | 0.4 | 0.5 |
| $1-a^2$ | 1.0 | 0.99 | 0.96 | 0.91 | 0.84 | 0.75 |

Figure 5:
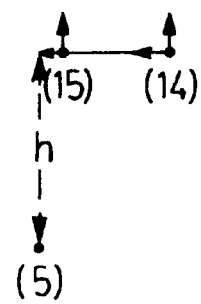
FIG. 5 illustrates a horizontally spaced apart sensor configuration according to a further embodiment of the invention.

FIG. 5 shows a further embodiment of the invention for determining the vertical gradient of Hy without the necessity of using a second magnetic field sensor spaced vertically apart from the first. In FIG. 5 there are two sensor locations, (14) and (15) rigidly spaced apart in the horizontal (y) direction. At each sensor location there are Hy and Hz AC sensors, (z being in the vertical direction).

The theoretical basis of this configuration is as follows:

In regions of space exterior to current flow sources, the magnetic field due to current flow (very low frequency approximation) is the derivative of a potential function V.

i.e. $H_y = -\partial V/\partial y$ \quad (16)

The vertical gradient of Hy, namely $$H'_y = \partial H_y/\partial z = -\partial^2 V/\partial y \partial z \quad (17)$$

However, $$-\partial^2 V/\partial y \partial z = \partial H_z/\partial y \quad (18)$$

as well.

Thus, the embodiment of FIG. 5 can be practiced using dual orthogonal sensors, measuring both $H_z$ and $H_y$, at two locations which are spaced apart horizontally in the y direction (i.e. orthogonal to the pipeline and to the direction of flight). In this manner, the vertical gradient of $H_y$ may be replaced with the gradient of $H_z$ in the horizontal (y) direction. This may have practical advantages for certain types of installations (e.g. fixed wing aircraft).

Rather than measuring only $H_y$, the total AC field, H, and its gradient, H' may be measured by employing, for example, three orthogonal magnetic field component sensors at each of two locations, one being displaced vertically above the other. FIG. 4 serves to illustrate this configuration as well. Taking the square root of the sum of squares of the component measurements at each location to determine H and H', it will be concluded, by referring back to equation (4), that $$H' = -200Ih/r^3 \quad (13)$$

The ratio of $H^2/H'$ is given by B where $$B = -200I(a^2+1)^{1/2} \quad (14)$$

where a is as before, or, by inversion, $$I = B/200(a^2+1)^{1/2} \quad (15)$$

The error function $(a^2+1)^{-1/2}$ is tabulated in Table 2 for the same range of relative offsets a.

TABLE 2

Offset Error Factor, for H, H'

| a | 0 | 0.1 | 0.2 | 0.3 | 0.4 | 0.5 |
|---|---|-----|-----|-----|-----|-----|
| $(a^2 + 1)^{-1/2}$ | 1.0 | 0.995 | 0.98 | 0.96 | 0.93 | 0.85 |

Thus it has been found to be advantageous to use total magnetic field sensors rather than a sensor measuring one particular component, as this approach allows for a larger departure of the measurement system from being directly over the pipeline without introducing intolerable errors into the calculation of the amplitude of the AC current flowing in the pipeline. For example, if h=100 m, and if a 5% error on the calculation of I would be acceptable, then a permissible measurement corridor of 66 m is feasible, but this reduces to only 44 m if just $H_y$ is measured.

For further accuracy in the determination of I, corrections can be made for the value of a, if a video of the flight path recovery is employed, and the path of the pipeline is visible on the tape. The horizontal offset of the pipeline image from the point on the ground vertically below the aircraft provides the value of a, since h is known, (approximately) from the aircraft altimeter (laser or radar). Alternatively, the precise location (in plan) of the pipeline may have been previously surveyed by GPS, and this information, coupled with the GPS position of the survey aircraft at all times, will determine the value of α.

A further benefit from the use of three orthogonal component sensors to measure the total magnetic field due to the AC current in the pipeline (i.e. the square root of the sum of squares) is that the measurement will be independent of the orientation of the aircraft (or of the sensors). If only the $H_y$ component is measured, as in the first embodiment of the invention, then any deviation of the AC magnetic field sensor from the y direction, (i.e. horizontal and orthogonal to the pipeline orientation), will give rise to an error in the determination of I.

Even when measuring with total field sensors there may be an error introduced due to the tilt of the axis joining the position of the two sensor locations. For the determination of H' a correction for the non-verticality of this axis may be achieved using dual clinometers, whereby to obtain the tilt of the axis from verticality, in two orthogonal directions. Other devices may be employed for the same purpose, e.g. a 3 component vector Earth's field magnetometer.

In the latter embodiment of the invention, where effectively a continuous determination of I is made along the pipeline, random errors in the determination of I may be suppressed by taking the moving mean of several consecutive measurements along the pipeline. It should also be noted that this embodiment, based on the use of Equation (15), also avoids the need to accurately estimate the value of h, the height of the measuring system above the conductor.

All embodiments of this invention utilize the determination of changes in the level of current flow along the pipeline to indicate the presence and location of holidays, in accordance with FIG. 1(b).

The foregoing describes several embodiments of this invention, whereby the location of important ground contact points (holidays) of a metal pipeline may be quickly and inexpensively determined by means of remote measurements (e.g. by an airborne survey, employing an aircraft or helicopter support), of magnetic fields, and the vertical gradient of these fields due to current flow in the pipeline. In this fashion remedial and preventive maintenance may be guided, in respect of active or potential future leaks due to corrosion of the pipeline.

Other embodiments of this invention may be devised by one skilled in the art.

I claim:

1. Apparatus for remotely determining the amount of current I flowing in a long, linear conductor, comprising:
    a first sensor means for measuring at a first location a magnetic field H arising due to current flow,
    a second sensor means for measuring at a second location the same magnetic field H,
    mounting means for fixing the position of the first and second sensor means in an unchanging, spaced-apart mutual configuration,
    calculating means for calculating the vertical gradient H' of said magnetic field on the basis of measurements made by the sensors; and
    means for calculating the said current I on the basis of the equation $I=kH^2/H'$ where k is a constant and H is one of either the magnetic field at one of said sensors or the mean magnetic field between both said sensors.

2. Apparatus as claimed in claim 1, where the current is a DC current flowing in a metal pipeline, due to the cathodic protection system of the pipeline.

3. Apparatus as claimed in claim 2, wherein k is a function of the ambient magnetic field and the orientation of the pipeline.

4. Apparatus as claimed in claim 2, wherein each sensor means is a total field magnetic sensor, the two sensors being spaced apart vertically and the quantities H and H' employed in the ratio calculation are the peak-to-peak values of these quantities, measured during a traverse across the pipeline.

5. Apparatus as claimed in claim 1, further including AC generator means, wherein the current flow is an AC current flow, established by connecting the said AC generator between the conductor and ground.

6. Apparatus as claimed in claim 5, wherein k is independent of the ambient magnetic field and the pipeline orientation.

7. Apparatus as claimed in claim 5, wherein said AC current is the ripple created by the full wave rectified output of an AC power generator.

8. Apparatus as claimed in claim 5, wherein said AC current has a frequency in the range of 5 to 100 Hz.

9. Apparatus as claimed in claim 5 or claim 7, wherein each sensor means is a component sensor, measuring AC fields.

10. Apparatus as claimed in claims 5 or claim 7, wherein the two sensor means are spaced apart horizontally, orthogonal to the conductor, and wherein each sensor means comprises at least two orthogonal component AC sensors, one measuring the vertical component of the AC magnetic field and the other measuring the horizontal component of said magnetic field, orthogonal to the conductor axis.

11. Apparatus as claimed in claim 5 or claim 7, wherein each sensor means is composed of three orthogonal AC component sensors, including means for determining the square root of the sum of the squares of the outputs of each component sensor, to derive the quantities H and H'.

12. Apparatus as claimed in claim 1 where said magnetic field sensors are transported by an aircraft or a helicopter.

13. Method for remotely determining the amount of current I flowing in a conductor comprising the steps of:
    measuring at a first location a magnetic field H arising due to the current flow;
    measuring at a second location the same magnetic field H;
    maintaining the first and second locations in an unchanging, spaced-apart mutual configuration;

determining from the measurements at said locations the vertical gradient H' of said magnetic field; and calculating the current I on the basis of the equation $I=kH^2/H'$ where k is a constant and H is one of either the magnetic field at one of said sensors or the mean magnetic field between both said sensors.

14. The method claimed in claim 13, wherein said conductor is a metal pipeline, and said current flow is the DC current created by the cathodic protection system of the pipeline.

15. The method as claimed in claim 14, wherein k is a function of the ambient magnetic field and the orientation of the pipeline.

16. The method claimed in claim 13, wherein said current flow is AC, created by the ripple on a full wave rectified DC cathodic protection current in the conductor.

17. The method claimed in claim 13, wherein said current flow is AC, created by connecting an AC generator across the conductor to ground.

18. The method claimed in claim 16 or claim 17 where k is independent of the ambient magnetic field or the orientation of the pipeline.

19. The method claimed in claim 13 wherein said magnetic field measurements are component measurements.

20. The method claimed in claim 13 wherein said measurements are total field measurements.

21. The method claimed in claim 13, wherein said measurements of magnetic fields are made from an aircraft or helicopter.

* * * * *